(12) United States Patent
Delfini et al.

(10) Patent No.: US 7,451,546 B2
(45) Date of Patent: Nov. 18, 2008

(54) JIGSAW MACHINE

(75) Inventors: Stefano Delfini, Bettlach (CH); Daniel Saegesser, Langenthal (CH); Thomas Ruoff, Kaempfelbach-Bilfingen (DE)

(73) Assignee: Robert Bosch GmbH, Stuttgart (DE)

( * ) Notice: Subject to any disclaimer, the term of this patent is extended or adjusted under 35 U.S.C. 154(b) by 218 days.

(21) Appl. No.: 10/581,830

(22) PCT Filed: Jul. 7, 2005

(86) PCT No.: PCT/EP2005/053256

§ 371 (c)(1),
(2), (4) Date: Jun. 5, 2006

(87) PCT Pub. No.: WO2006/032550

PCT Pub. Date: Mar. 30, 2006

(65) Prior Publication Data

US 2007/0107238 A1 May 17, 2007

(30) Foreign Application Priority Data

Sep. 21, 2004 (DE) .................. 10 2004 045 624

(51) Int. Cl.
*B27B 19/04* (2006.01)
*B23D 51/10* (2006.01)

(52) U.S. Cl. .......................... 30/392; 30/393
(58) Field of Classification Search ............ 30/392, 30/394, 393
See application file for complete search history.

(56) References Cited

U.S. PATENT DOCUMENTS

| 365,441 | A | * | 6/1887 | Larsh .................... 83/825 |
| 4,628,605 | A | | 12/1986 | Clowers |
| 5,644,847 | A | * | 7/1997 | Odendahl et al. ........... 30/394 |
| 6,920,694 | B2 | | 7/2005 | Hecht et al. |

FOREIGN PATENT DOCUMENTS

| DE | 35 09 515 | 9/1986 |
| DE | 101 19 561 | 10/2002 |
| JP | 2002103302 | 4/2002 |
| WO | 02/22297 | 3/2002 |

* cited by examiner

*Primary Examiner*—Kenneth E. Peterson
*Assistant Examiner*—Sean Michalski
(74) *Attorney, Agent, or Firm*—Michael J. Striker

(57) ABSTRACT

A hand-held jigsaw machine includes a machine housing (11), a saw blade (13) that is drivable in a reciprocating manner by a motor, a support device (20) with a support roller (23) that supports the saw blade on its back (132), and a holder (22) that is fixed to the machine housing (11) and accommodates the support roller (23) between two arms (222, 223), and a guide device (21) for guiding and supporting the saw blade (13) transversely to the saw direction with guide elements (24, 25) on opposite sides of the saw blade (13) at an adjustable distance from each other. To ensure economical production of the support and guide device and to reduce the number of components required, the guide device (21) is integrated in the holder (22) of the support device (20).

5 Claims, 2 Drawing Sheets

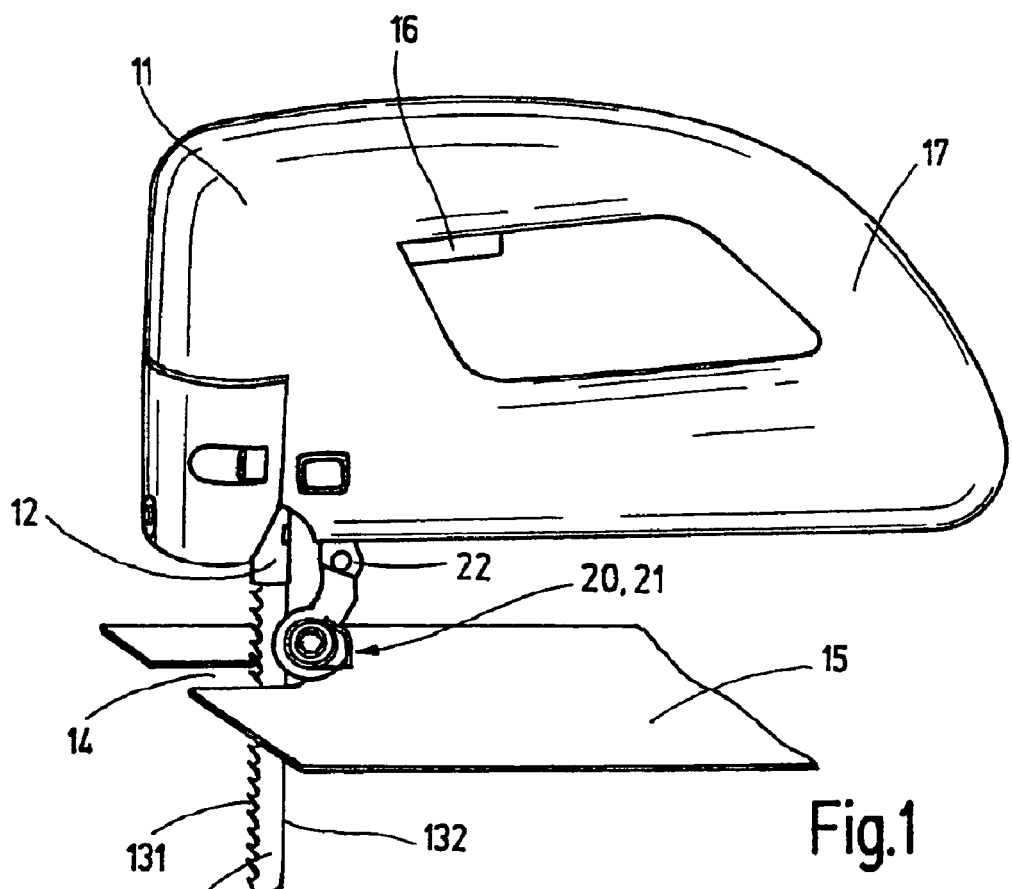
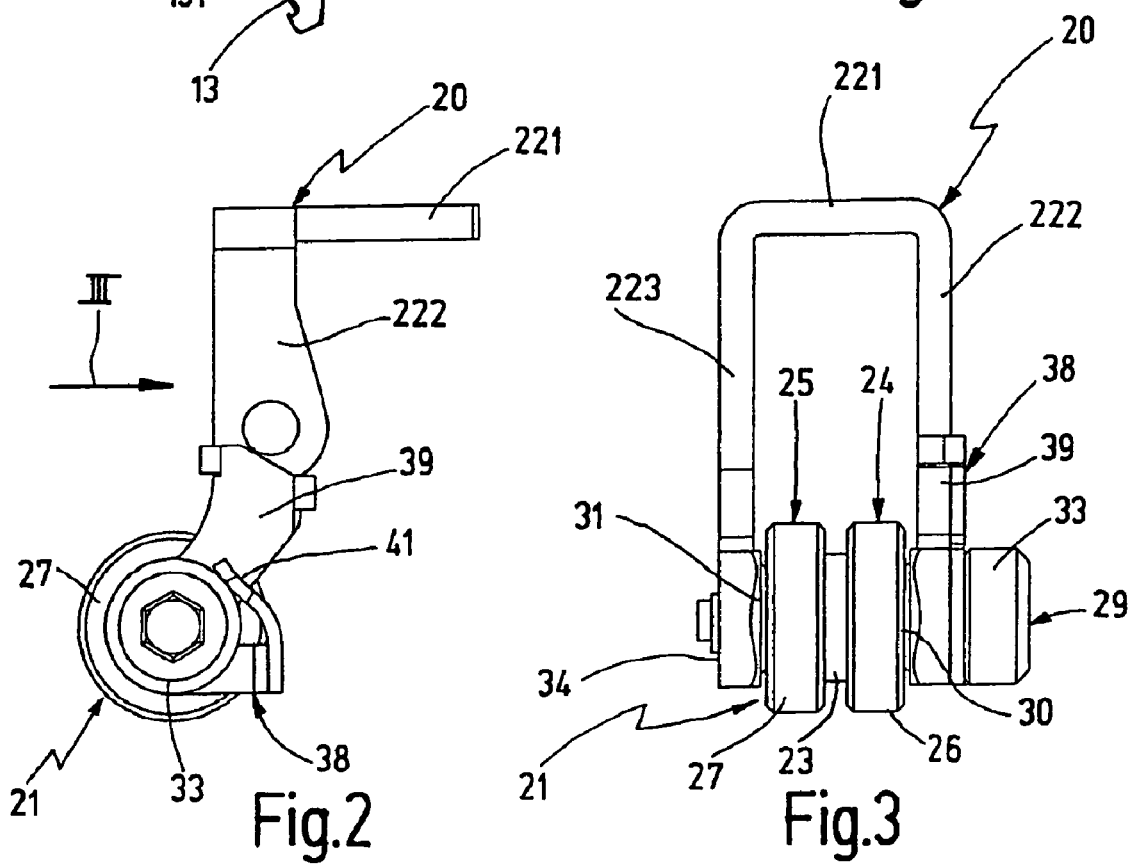

JIGSAW MACHINE

CROSS-REFERENCE

The invention described and claimed hereinbelow is also described in PCT/EP 2005/053256, filed on Jul. 7, 2005 and DE 102004045624.9, filed Sep. 21, 2004. This German Patent Application, whose subject matter is incorporated here by reference, provides the basis for a claim of priority of invention under 35 U.S.C. 119(a)-(d).

BACKGROUND OF THE INVENTION

The present invention is directed to a jigsaw machine.

A known hand-held jigsaw machine (DE 101 19 561 A1) referred to as a hand-guided jigsaw includes a pendulum device with a U-shaped holder fastened to the housing of the jigsaw and a support roller located between the holder arms that supports the saw blade on its back. The support roller is provided with a V-shaped groove in which the saw blade back is accommodated. To suppress a lateral deflection of the pendulum device transversely to the saw direction during sawing, guiding means are provided that are fastened to the housing of the jigsaw or to a base plate that supports the jigsaw on the workpiece to be sawed. The guiding means have a forked design and include guide jaws—which face each other—on the fork ends that clamp the holder of the pendulum device and specifically in the region of the holder in which the support roller is located.

A known, hand-guided jigsaw (WO 02/22297 A1) includes a support device with a support roller that supports the saw blade, in the saw direction, on its back and drives it as needed in the saw direction in a pendulum manner. To suppress a lateral deflection of the saw blade transversely to the saw direction during sawing, the jigsaw includes a guide device for guiding and providing lateral support of the saw blade that includes two guide elements that bear against the sides of the blade facing away from each other and a servomotor designed as a spring drive, with which the distance between the guide elements can be adjusted depending on the thickness of the saw blade. The guide device is coupled with a clamping device that holds the saw blade such that the guide elements lift away from the saw blade when the clamping device is opened and are placed against the sides of the saw blade when the clamping device is closed. The guide elements are designed as rolling bodies or ceramic parts, one each of which is located on the lever arm of a two-armed swivelling lever. The swivelling levers, which are designed similar to the arms of tongs, are connected by a joint and engage—via guide bolts that extend out of their lever arms facing away from the guide elements—in grooves of a support component that extend away from each other in the longitudinal direction of the saw blade slightly diagonally at an angle of less than 6°. When the support component is displaced, the swivelling levers are swiveled via the groove flanks and the guide bolts. Two compression springs engage in the support component that load the support component in the longitudinal direction of the saw blade and attempt to displace the swivelling levers via the grooves and guide bolts such that the guide elements on the swivelling levers bear against the sides of the saw blade with spring preload.

SUMMARY OF THE INVENTION

The hand-held jigsaw according to the present invention has the advantage that, due to the manner of assembly of the support device and the guide device for the saw blade, a simpler design of the hand-held jigsaw machine is attained without negatively affecting the quality of support of the saw blade—which is required for a good sawing result—in the saw direction and transversely to the saw direction. Significantly fewer components are required for the support and guide device, which results in cost reductions in production and assembly. Due to the fact that the distance between the guide elements is manually adjustable, any saw blades is guided equally well transversely to the saw direction, independent of the thickness of the saw blades.

According to an advantageous embodiment of the present invention, the guide elements are designed as guide disks that have an outer diameter that is greater than the outer diameter of the support roller and enclose the support roller between them. Preferably, one disk is designed integral with the support roller and the other disk is located on the support roller such that it is axially displaceable.

According to an advantageous embodiment of the present invention, to create a variable distance between the guide disks, a displacement member is provided for the axial displacement of the guide disks that is coupled with a manual actuating member.

According to an advantageous embodiment of the present invention, the displacement member has two displacement disks that have a thickness that is variable across the circumference, one each of which is located between a guide disk and an arm of the holder. A compression spring located in the interior of the support roller presses the guide disks against the displacement disks and presses the displacement disks against the arms of the holder. When the displacement disks are rotated, the two guide disks are displaced relative to each other, and the axial distance between them changes. In fact, their axial separation can be adjusted depending on the thickness of the saw blade to be guided.

BRIEF DESCRIPTION OF THE DRAWINGS

The present invention is described in greater detail below with reference to an exemplary embodiment shown in the drawing.

FIG. 1 shows a perspective view of a hand-held jigsaw machine in a schematic depiction, FIG. 2 shows an enlarged depiction of a support and guide device for the saw blade in the hand-held jigsaw machine in FIG. 1, FIG. 3 shows a front view of the support and guide device in the direction of arrow III in FIG. 2.

DETAILED DESCRIPTION OF THE EXEMPLARY EMBODIMENT

Figure 4:
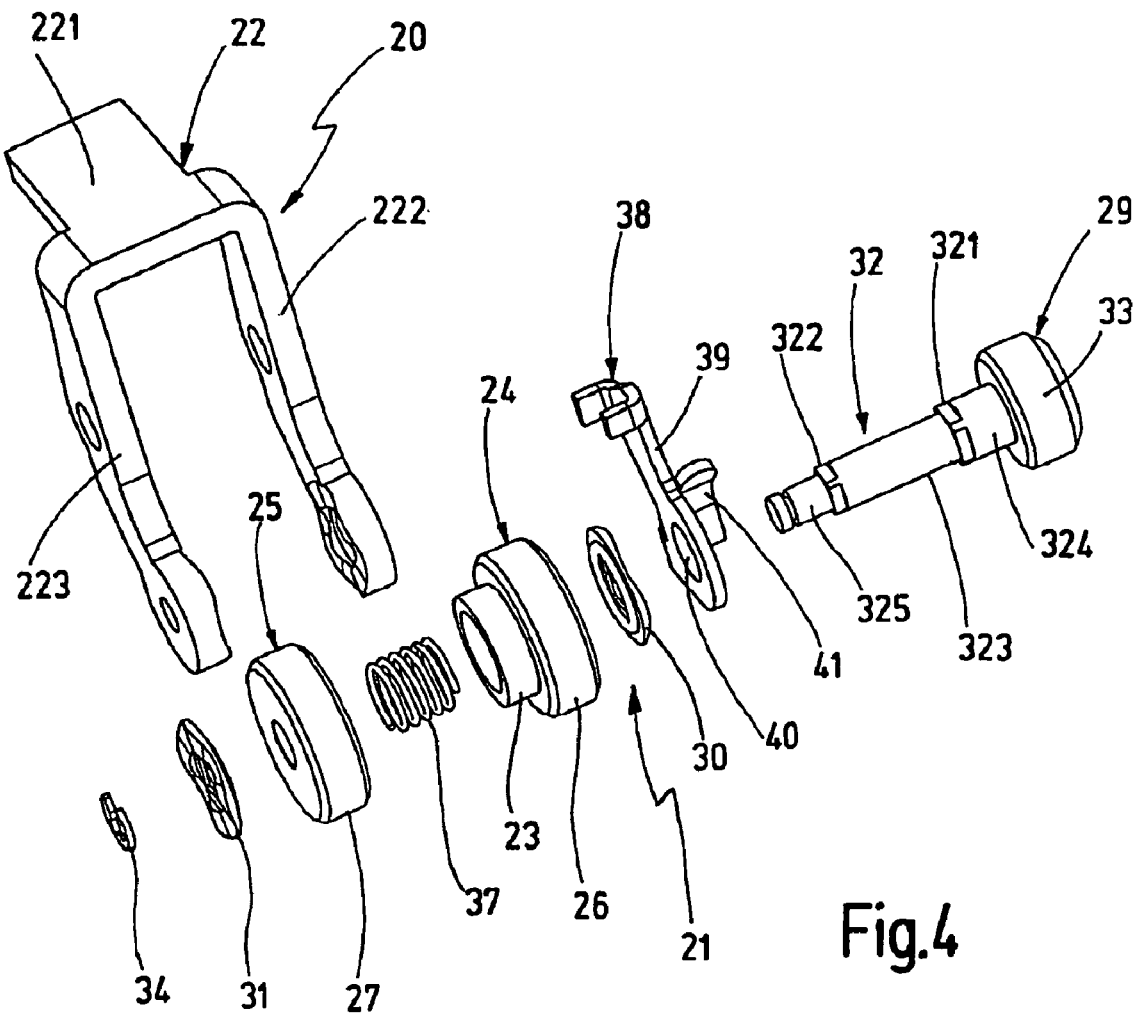
FIG. 4 shows an exploded depiction of the support and guide device in FIGS. 1 and 2.

The hand-held jigsaw machine or hand-guided jigsaw machine shown schematically in FIG. 1 has a machine housing 11 in which an electric motor is located, the electric motor having a gearbox for driving a lifting rod 12 to make an up and down reciprocating motion. A saw blade 13 is coupled detachably yet captively via its clamping shank to lifting rod 12. Saw blade 13, which includes a saw blade strip 131 and a saw blade back 132 facing away therefrom is guided through a passage 14 in a base plate 15 that is fixed to machine housing 11 and is placed on the work piece to be sawed when the hand-held jigsaw machine is used. The electric motor of the hand-held jigsaw machine is turned on and off using a push button 16 that is located on the underside of a handle 17 formed in machine housing 11.

To prevent the free end of saw blade 13 from deflecting during sawing and, therefore, to prevent a resultant low-quality cutting result, a support device 20 is provided that supports saw blade 13 in the saw direction, and a guide device 21 is provided that supports and guides saw blade 13 transversely to the saw direction. Support and guide devices 20, 21 are integrated in each other so that components of one device simultaneously perform functions in the other device. Support device 20 includes a U-shaped holder 22 with two arms 222, 223 that are interconnected by a transverse part 221. A support roller 23 is located between the ends of arms 222, 223 that supports saw blade 13 via its back 132. Holder 22 is guided in machine housing 11 in the saw direction behind saw blade 13 and is fastened there with its transverse part 221. Guide device 21 has two guide elements 24, 25 that rest on sides of saw blade 13 that face away from each other and accommodate saw blade 13 between them. The axial distance between guide elements 24, 25 is adjustable, so that saw blades 13 having different thicknesses can be guided between guide elements 24, 25 without wear.

Figure 5:
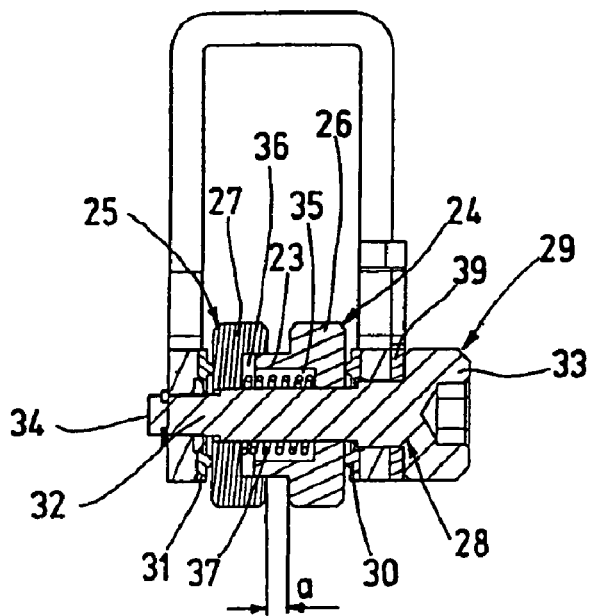
FIG. 5 shows a portion of an enlarged sectional view of the support and guide device in FIG. 3.

Guide elements 24, 25 are designed as guide disks 26, 27 that have an outer diameter that is greater than the outer diameter of support roller 23 and enclose support roller 23 between them. Guide disk 26 is designed integral with support roller 23, and guide disk 27 is displaceably located on support roller 23. To change the axial distance between guide disks 26, 27, guide device 21 includes a displacement member for the axial displacement of guide disks 26, 27 that is coupled with a manual actuating member 29 to set a desired axial separation. Displacement member 28 includes two displacement disks 30, 31. Displacement disk 30 is located between guide disk 26 and arm 222 of holder 22, and displacement disk 31 is located between guide disk 27 and arm 223 of holder 22. The two displacement disks 30, 31 are profiled on the side that faces arms 222, 223 and, as a result, have an axial thickness that varies around the circumference. Arms 222, 223 have the same profile on their side facing displacement disks 30, 31, so that, when displacement disks 30, 31 are rotated relative to arms 222, 223, displacement disks 30, 31 are displaced axially relative to each other. Displacement disks 30, 31 are fastened rotatably to a shaft 32 supported in arms 222, 223, while guide disks 26, 27 and support roller 23 are rotatably mounted on shaft 32. Actuating member 29 in the form of a rotary knob 33 is non-rotatably connected with shaft 32 at one end of shaft 32. A snap ring 34 is slid onto the other end of shaft 32 and prevents shaft 32 from pulling out of arms 222, 223. As shown in FIG. 5 in particular, a coaxial, cylindrical recess 35 is provided in support roller 23 that extends into guide disk 26 designed integral with support roller 23. Guide disk 27 also has a central, cylindrical recess 36 formed from the side of guide disk 27 facing support roller 23 outward, and the inner diameter of which is slightly larger than the outer diameter of support roller 23, so that guide disk 26 can extend above support roller 23 with minimal play. A compression spring 37 slid onto shaft 32 bears against the bottoms of recesses 35, 36 and presses guide disk 26 against displacement disk 30, and presses displacement disk 30 against arm 222, presses guide disk 27 against displacement disk 31, and presses displacement disk 31 against arm 223.

The components described are shown in FIG. 4 in an exploded view, and assembled in FIGS. 2, 3 and 5. To non-rotatably connect displacement disks 30, 31 with shaft 32, displacement disks 30, 31 have a rectangular, central recess with which they are slid onto sections 321 and 322 of shaft 32, each of which has a corresponding rectangular cross section (FIG. 4). Section 323 of shaft 32 that extends between these two sections 321 and 322 is cylindrical in order to accommodate guide disks 26, 27 and support roller 23. Sections 324 and 325 of shaft 32 that extend beyond sections 321 and 322 are also cylindrical, and they support shaft 32 in arms 222, 223 of holder 22.

When rotary knob 33 is rotated, displacement disks 30, 31 pressed against fixed arms 222, 223 of holder 22 are therefore rotated via shaft 32. Depending on the direction of rotation, the distance of guide disks 26, 27 from associated arm 222 or 223, respectively, increases or decreases depending on the increasing or decreasing thickness of displacement disks 30, 31. As a result, guide disk 27 slides onto support roller 23 more or less further and, as a result, the axial separation a between the end faces of guide disks 26 facing each other becomes smaller or larger and can therefore be adjusted for the particular thickness of the saw blade. Due to the fact that—as described—two identically designed displacement disks 30, 31 are positioned with mirror symmetry, the central position of the guide gap between guide disks 26, 27 is always retained for saw blade 13. Axial separation a between guide disks 26, 27 that is adjusted in this manner is retained via the stiction between the components of guide device 21.

Advantageously, an additional locking member 38 is provided that fixes shaft 32 in its particular rotary position in a non-positive and/or form-fit manner. Locking member 38 shown in FIG. 4 includes a supporting arm 39 that is slid via an opening 40 onto shaft 32 such that it is located between rotary knob 33 and arm 222. Supporting arm 39 is attached via the free end to arm 222. Supporting arm 39 carries an axially projecting clamp 41 that presses on rotary knob 33 in a non-positive manner. As an alternative, locking member 38—designed as a retaining plate with a locking projection—and rotary knob 33 can be provided with corrugation, in which the locking projection engages. The locking projection can be lifted out of the corrugation by swivelling the retaining plate.

What is claimed is:

1. A hand-held jigsaw machine with a machine housing (11), a saw blade (13) that is drivable in a reciprocating motion by a motor and that includes a sawtooth strip (131) and a saw blade back (132) diametrically opposed thereto, with a support device (20) with a support roller (23) that supports the saw blade on its back (132), a holder (22) that is fixed to the housing (11) and accommodates the support roller (23) between two arms (222, 223), and a guide device (21) for guiding and supporting the saw blade (13) transversely to the saw direction and that includes guide elements (24, 25) located on opposite sides of the saw blade (13) at an adjustable distance from each other, wherein the guide device (21) is integrated in the holder (22) of the support device (20), wherein the guide elements (24, 25) are designed as guide disks (26, 27) that have an outer diameter that is greater than the outer diameter of the support roller (23) and enclose the support roller (23) between them, wherein the guide device (21) includes a displacement member (28) for axially displacing the guide disks (26, 27), and wherein the displacement member (28) is coupled with a manual actuating member (29), wherein the displacement member (28) has two identical displacement disks (30, 31), the axial width of which varies across the circumference, wherein one displacement disk (30, 31) each is located between a guide disk (26, 27) and an arm (222, 223) of the holder (22), and wherein a compression spring (37) is located in the interior of support roller (23) that bears against the two guide disks (26, 27) and presses against the displacement disks (30, 31).

2. The hand-held jigsaw as recited in claim 1, wherein one of the guide disks (26) is designed integral with the support roller (23) and the other guide disk (27) is located such that it is axially displaceable on the support roller (23).

3. The hand-held jigsaw machine as recited in claim 1, wherein the actuating member (29) is designed as rotary knob (33).

4. The jigsaw machine as recited in claim 1, wherein the support roller (23) and the guide disks (26, 27) are mounted on a shaft (32) that is rotatably accommodated in the arms (222, 223) of holder (22), and wherein the displacement disks (30, 31) and the actuating member (29) are rotatably located on the shaft (32).

5. The hand-held jigsaw machine as recited in claim 4, wherein the guide device (21) includes a locking member (38) for fixing the shaft (32) in its particular rotary position.

* * * * *